United States Patent
Sylvester et al.

(10) Patent No.: US 12,261,426 B2
(45) Date of Patent: Mar. 25, 2025

(54) CABLE MANAGEMENT SYSTEM

(71) Applicant: Panduit Corp., Tinley Park, IL (US)

(72) Inventors: David J. Sylvester, Manhattan, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/651,879

(22) Filed: May 1, 2024

(65) Prior Publication Data

US 2024/0283231 A1    Aug. 22, 2024

Related U.S. Application Data

(63) Continuation of application No. 17/950,565, filed on Sep. 22, 2022, now Pat. No. 12,003,082.

(51) Int. Cl.
*H02G 3/04*    (2006.01)

(52) U.S. Cl.
CPC .................. *H02G 3/0456* (2013.01)

(58) Field of Classification Search
CPC .................................... H02G 3/0456
See application file for complete search history.

(56) References Cited

U.S. PATENT DOCUMENTS

| | | |
|---|---|---|
| 1,698,531 A | 1/1929 | Brenizer |
| 1,705,233 A | 3/1929 | Brenizer |
| 2,318,859 A * | 5/1943 | Huguelet ............... H02G 5/025 |
| | | 174/70 B |
| 3,506,227 A | 4/1970 | Jenkins |
| 4,136,423 A | 4/1979 | Sterling |
| 4,151,533 A | 4/1979 | Vogt |
| 4,799,641 A * | 1/1989 | Koreski ................ F16L 3/2235 |
| | | 248/68.1 |
| 4,840,333 A | 6/1989 | Nakayama |
| 5,184,794 A * | 2/1993 | Saito ......................... F16L 3/13 |
| | | 248/74.1 |
| 5,188,319 A * | 2/1993 | Hawash .............. B60R 16/0215 |
| | | 248/68.1 |
| 5,954,300 A * | 9/1999 | Sturies .................. F16L 55/035 |
| | | 248/68.1 |

(Continued)

FOREIGN PATENT DOCUMENTS

| | | |
|---|---|---|
| EP | 1215432 A2 | 6/2002 |
| EP | 3972066 A1 | 3/2022 |
| WO | 2021211788 A1 | 10/2021 |

OTHER PUBLICATIONS

Snake Tray's Cable Management for Solar Brochure; Sep. 2020 (12 pgs.).

*Primary Examiner* — Monica E Millner
(74) *Attorney, Agent, or Firm* — Aimee E. McVady; Christopher S. Clancy; James H. Williams

(57) ABSTRACT

A cable management system designed to support cables in solar applications. The cable management system includes a U-shaped bracket and at least one clamp half. The U-shaped bracket has a base with two arms with each arm including a securement slot. The clamp half has a top, a bottom, a front, a back, and sides with button pads extending from the sides. The clamp half is installed within the U-shaped bracket such that the button pads slide in the securement slots to position the clamp half in the U-shaped bracket. The clamp half separates and supports the cables installed in the U-shaped bracket.

13 Claims, 6 Drawing Sheets

(56) References Cited

U.S. PATENT DOCUMENTS

| | | | |
|---|---|---|---|
| 6,261,037 B1* | 7/2001 | Richards | F16L 3/2235 |
| | | | 410/36 |
| 6,530,545 B2 | 3/2003 | Deciry et al. | |
| 6,561,466 B1 | 5/2003 | Myers et al. | |
| 7,418,186 B1* | 8/2008 | Grubish | G02B 6/4477 |
| | | | 385/137 |
| 7,734,139 B2* | 6/2010 | Rector, III | G02B 6/44765 |
| | | | 385/136 |
| 8,074,945 B2* | 12/2011 | Schoenau | F16L 5/14 |
| | | | 248/65 |
| 8,783,628 B2 | 7/2014 | Jette | |
| 8,967,556 B2* | 3/2015 | Meyers | H02G 3/32 |
| | | | 248/68.1 |
| 9,464,734 B2* | 10/2016 | Okura | H02G 3/22 |
| 9,722,405 B2 | 8/2017 | Smith et al. | |
| 9,800,028 B1 | 10/2017 | Smith et al. | |
| 9,996,121 B2* | 6/2018 | Mitsuishi | H02G 3/30 |
| 10,063,039 B2 | 8/2018 | Smith et al. | |
| 10,225,947 B2 | 3/2019 | Jette | |
| 10,666,029 B2 | 5/2020 | Jette | |
| 10,670,170 B2 | 6/2020 | Shea et al. | |
| 10,944,355 B2 | 3/2021 | Jette | |
| 10,978,861 B2 | 4/2021 | Smith et al. | |
| 11,205,890 B2 | 12/2021 | Jette | |
| 11,271,519 B2 | 3/2022 | Jette | |
| 11,349,291 B2 | 5/2022 | Smith et al. | |
| 12,003,082 B2* | 6/2024 | Sylvester | H02G 3/32 |
| 2010/0207001 A1* | 8/2010 | Smith | F16L 55/035 |
| | | | 248/230.4 |
| 2016/0058182 A1* | 3/2016 | Langston | A47B 47/0091 |
| | | | 211/85.18 |
| 2022/0038046 A1 | 2/2022 | Wedding et al. | |
| 2022/0112969 A1 | 4/2022 | Jette | |
| 2022/0190577 A1 | 6/2022 | Worden | |
| 2022/0255300 A1 | 8/2022 | Rand et al. | |
| 2023/0012633 A1* | 1/2023 | Khan | F16L 3/222 |

* cited by examiner

CABLE MANAGEMENT SYSTEM

CROSS REFERENCE TO RELATED APPLICATION(S)

This application is a continuation of U.S. patent application Ser. No. 17/950,565, filed Sep. 22, 2022, the entirety of which is hereby incorporated by reference herein.

FIELD OF THE INVENTION

The present invention relates to a cable management system, and more particularly to a messenger wire cable management system for solar applications.

BACKGROUND OF THE INVENTION

The use of solar panels for electrical power generation is a rapidly growing sustainable energy source. Each solar panel requires an electrical connection to collect the electric energy for use, storage, or connection to a power grid. The electrical energy produced by a single panel does not require large conductors but as the panels are connected to each other the conductor size must be increased to accommodate the amount of current being produced by the panels and carried by the conductor. Thus, large solar farms can produce a large amount of energy that requires large cables to carry the current. The cables are often suspended and routed with brackets hung from messenger wires. The number of cables in each bracket will vary but some installations might require 20 or more cables per bracket. If the cables are laying next to each other in the bracket, the current limit of the cables will be required to be derated. Free air space and derating of cables are defined in National Electric Code, NEC 100 and NEC 310, respectively. The free air space reduces the need to derate the current carrying limit of conductors. Thus, maintaining cable separation in the bracket will reduce or eliminate the derating factor for the cables. As a result, there is a need for an improved bracket that securely holds and separates the cables, that can be easily installed, and that includes minimum components.

SUMMARY OF THE INVENTION

A cable management system that supports cables in solar applications. The cable management system includes a U-shaped bracket and at least one clamp half positioned within the U-shaped bracket. The U-shaped bracket has a base with two arms with each arm including a securement slot. The clamp half has a top, a bottom, a front, a back, and sides with button pads extending from the sides. The button pads slide in the securement slots to position the clamp half within the U-shaped bracket. The clamp half separates and supports the cables installed in the U-shaped bracket.

DETAILED DESCRIPTION

Figure 1:
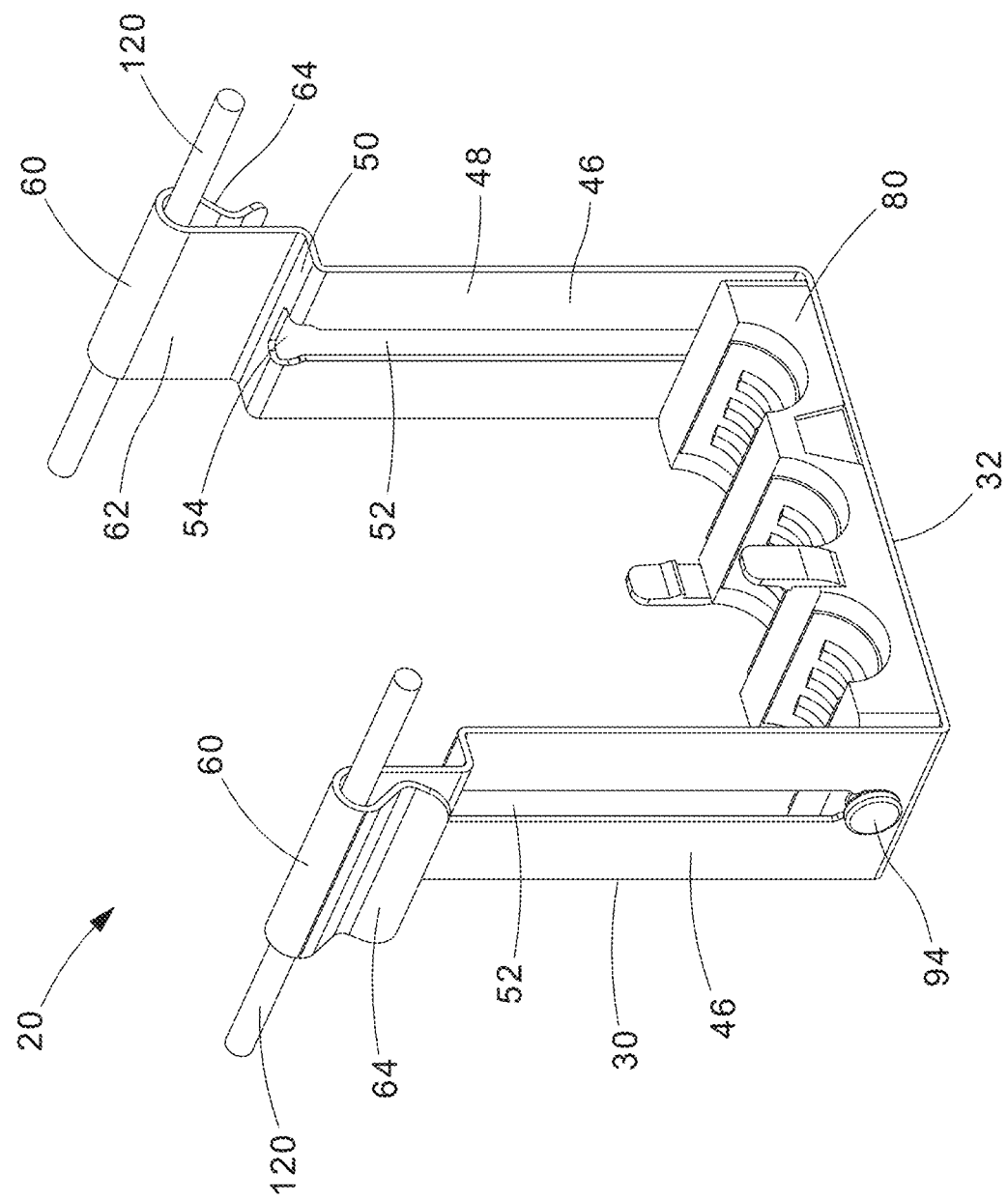
FIG. 1 is a perspective view of a partially assembled cable management system of the present invention.

The present invention is directed to a cable management system 20 for solar applications. The cable management system includes a U-shaped bracket 30 and a plurality of clamp halves 80 that form cable clamps (see FIGS. 5-6). The U-shaped bracket 30 provides a stable and secure platform for the polymer cable clamps. FIG. 1 illustrates the U-shaped bracket 30 with one clamp half 80 positioned therein.

Figure 2:
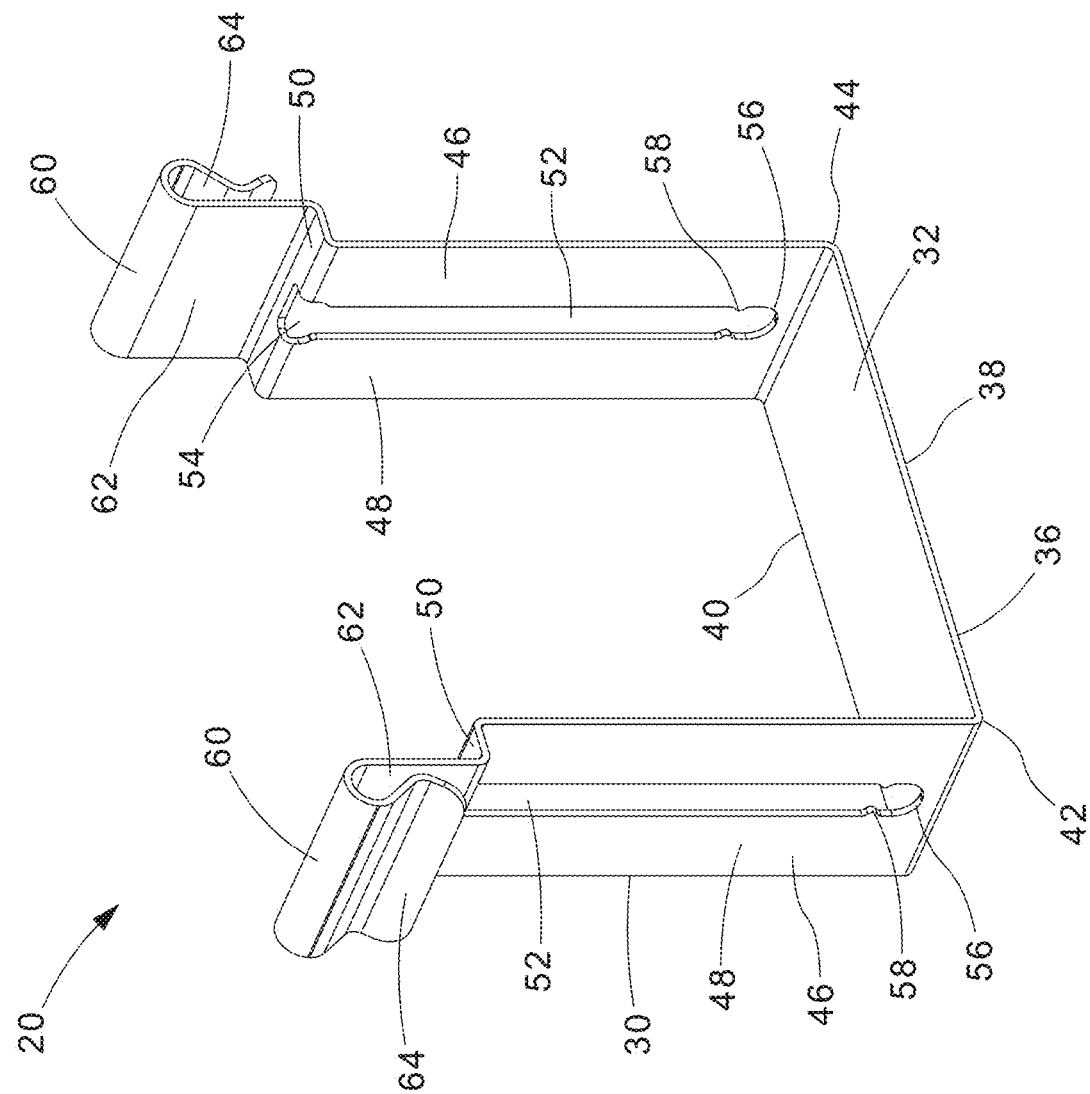
FIG. 2 is a perspective view of the U-shaped bracket of the cable management system of FIG. 1.

As illustrated in FIG. 2, the U-shaped bracket 30 includes a base 32 with a top 34, a bottom 36, a front 38, a back 40, a first side 42, and a second side 44. Arms 46 extend from the first side 42 and the second side 44 of the base 32. The arms 46 include a vertical member 48 that extends to a horizontal member 50. Each arm 46 includes a securement slot 52 located in the center of the arm 46. The securement slots 52 include an enlarged entrance end 54 located in the horizontal member 50. The entrance end 54 allows for loading of the clamp half 80 in the bracket 30 without manipulating the bracket 30. Each securement slot 52 extends from the entrance end 54 in the horizontal member 50, down the center of the vertical member 48, to a circular bottom 56 with locking tabs 58 in the vertical members 48 of each arm 46.

Messenger wire latches 60 are located at the distal end of the horizontal member 50 of the arms 46. The messenger wire latches 60 secure messenger wires 120 for the solar application. The messenger wire latches 60 include a vertical member 62 connected to a spring hook 64. The messenger wire latches 60 provide range taking capabilities when receiving various diameter messenger wires 120. The messenger wire latches 60 provide easy attachment and reduce the amount of part numbers required for the cable management system.

Figure 3:
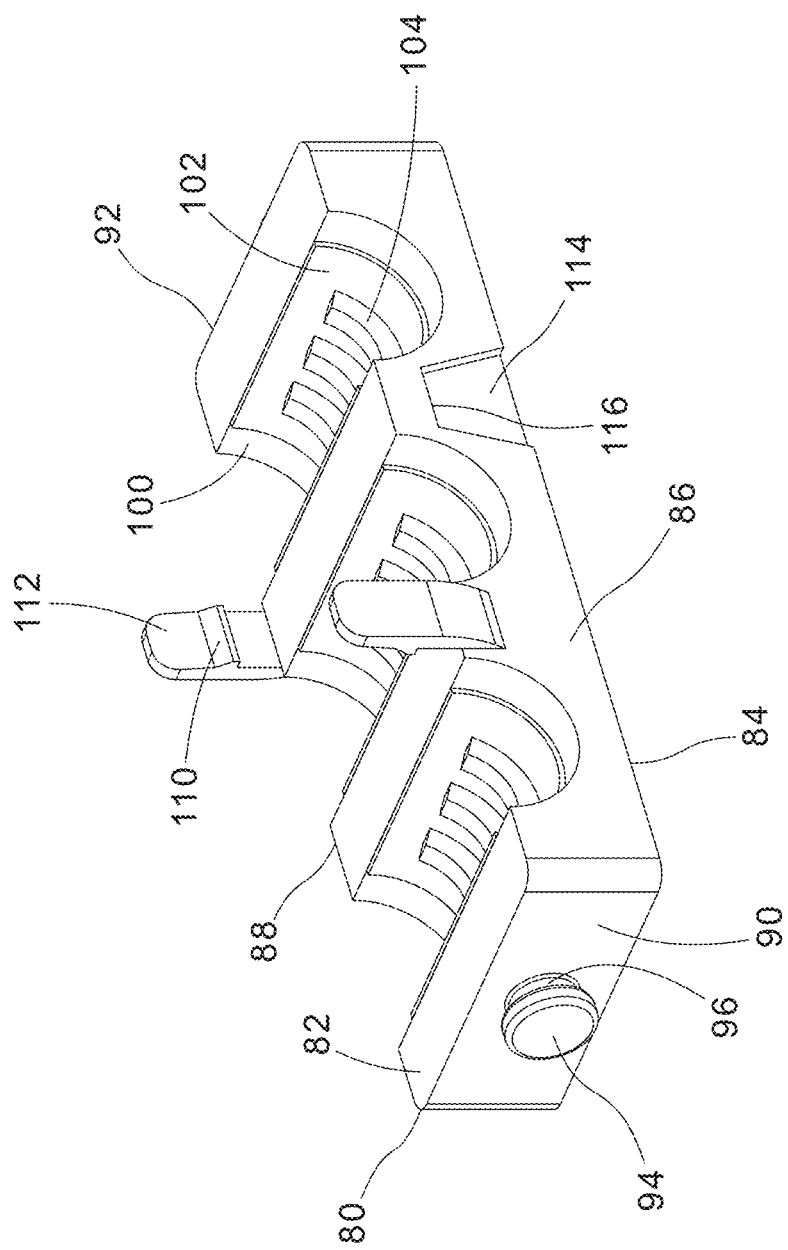
FIG. 3 is a perspective view of a clamp half of the cable management system of FIG. 1.

As illustrated in FIG. 3, the clamp half 80 includes a top 82, a bottom 84, a front 86, a back 88, a first side 90 and a second side 92. Each side 90, 92 of the clamp half 80 includes a button pad 94 that extends from a center of each side 90, 92 via a shaft 96.

The top 82 of the clamp half 80 includes a plurality of saddles 100. The saddles 100 are semi-circular and include a cushion insert 102. The cushion inserts 102 have flexible ribs 104 that enable the use of multiple cables or a single cable with different diameters to be positioned in each of the saddles 100 within a single clamp half 80. The flexible ribs 104 securely hold the various cable sizes while preventing the cables from being damaged. The cushion inserts 102 can be either a separate molded component this is inserted manually into the clamp half 80 or the cushion inserts 102 can be manufactured with the clamp half 80 by an over molding process.

Figure 5:
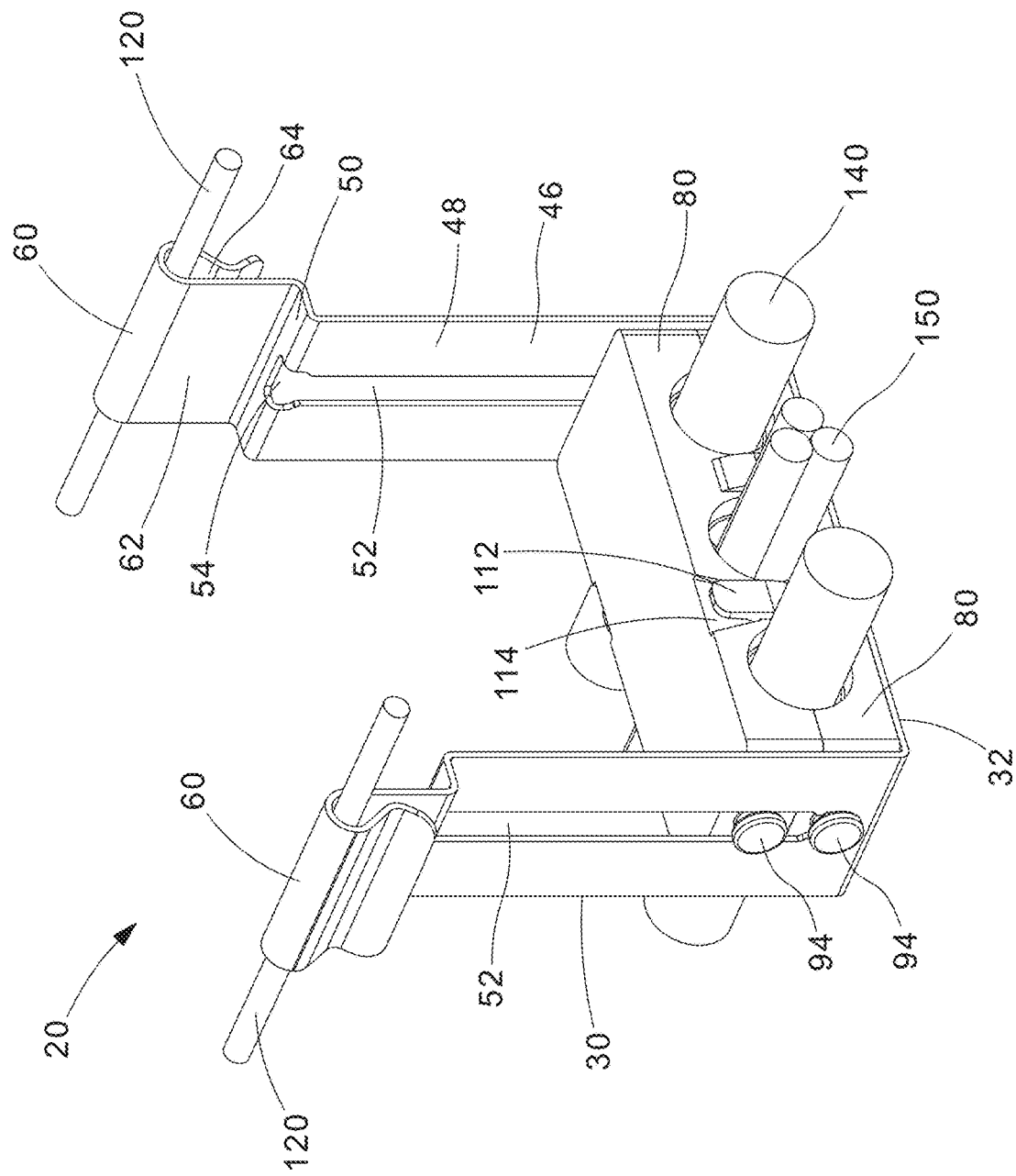
FIG. 5 is a perspective view of the cable management system of FIG. 4 with a top clamp half positioned in the U-shaped bracket and secured to the bottom clamp half to from a cable clamp.
Figure 6:
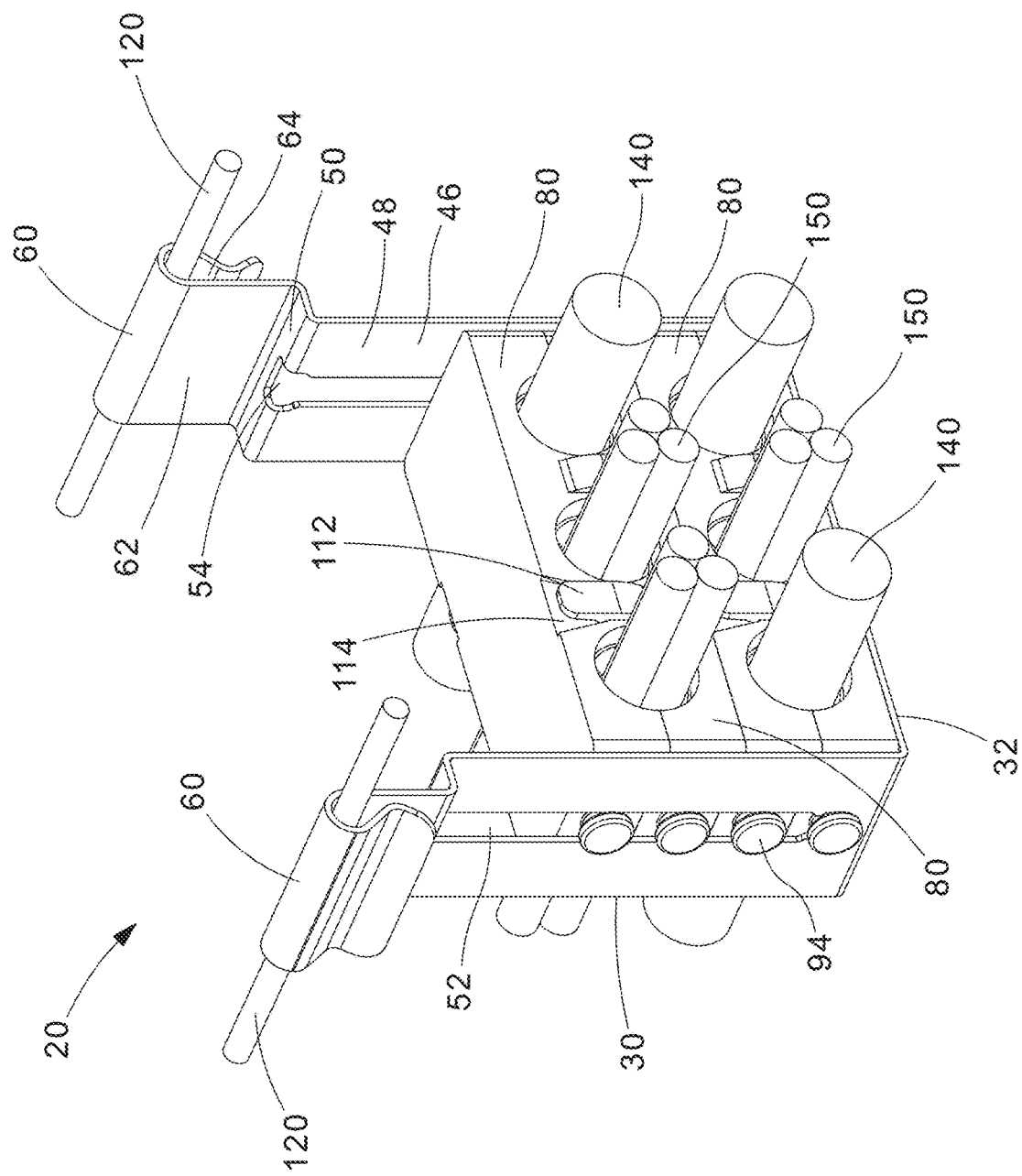
FIG. 6 is a perspective view of the cable management system of FIG. 5 with a second cable clamp and cables positioned within the bracket.

The front 86 and the back 88 of the clamp halves 80 include releasable latches 110 with thumb tabs 112. The front 86 and back 88 of the clamp halves 80 also include a notch 114 or opening with a ledge 116. The releasable latch 110 extending from the front 86 of the clamp half 80 is aligned with the notch 114 and ledge 116 in the back 88 of the clamp half 80 and the releasable latch 110 extending from the back 88 of the clamp half 80 is aligned with the notch 114 and ledge in the front 86 of the clamp half 80. As illustrated in FIGS. 5-6, two clamp halves 80 are snapped together via the releasable latch 110 engaging the ledge 116 defined by the notch 114 to create a cable clamp assembly.

Once the two messenger wires 120 are installed for the solar application (not illustrated), the U-shaped bracket 30 is snapped onto the messenger wires 120. A clamp half 80 is inserted in the U-shaped bracket 30 with the bottom 84 of the clamp half 80 positioned to be placed on the base 32 of the U-shaped bracket 30 and the saddles 100 of the clamp half 80 facing upwards. The button pads 94 extending from the sides 90, 92 of the clamp half 80 are inserted in the entrance end 54 of the securement slots 52 of the U-shaped bracket 30. The clamp half 80 is slid towards the base 32 of the U-shaped bracket 30 via the button pads 94 in the securement slot 52. As illustrated in FIG. 1, the clamp half 80 is locked in place in the U-shaped bracket 30 once the button pads 94 pass the locking tabs 58 of the securement slot 52. The button pads 94 are positioned at the circular bottom 56 of the securement slot 52. The securement slot 52 also maintains the alignment of clamp halves 80 when multiple clamp halves are installed in the U-shaped bracket.

Figure 4:
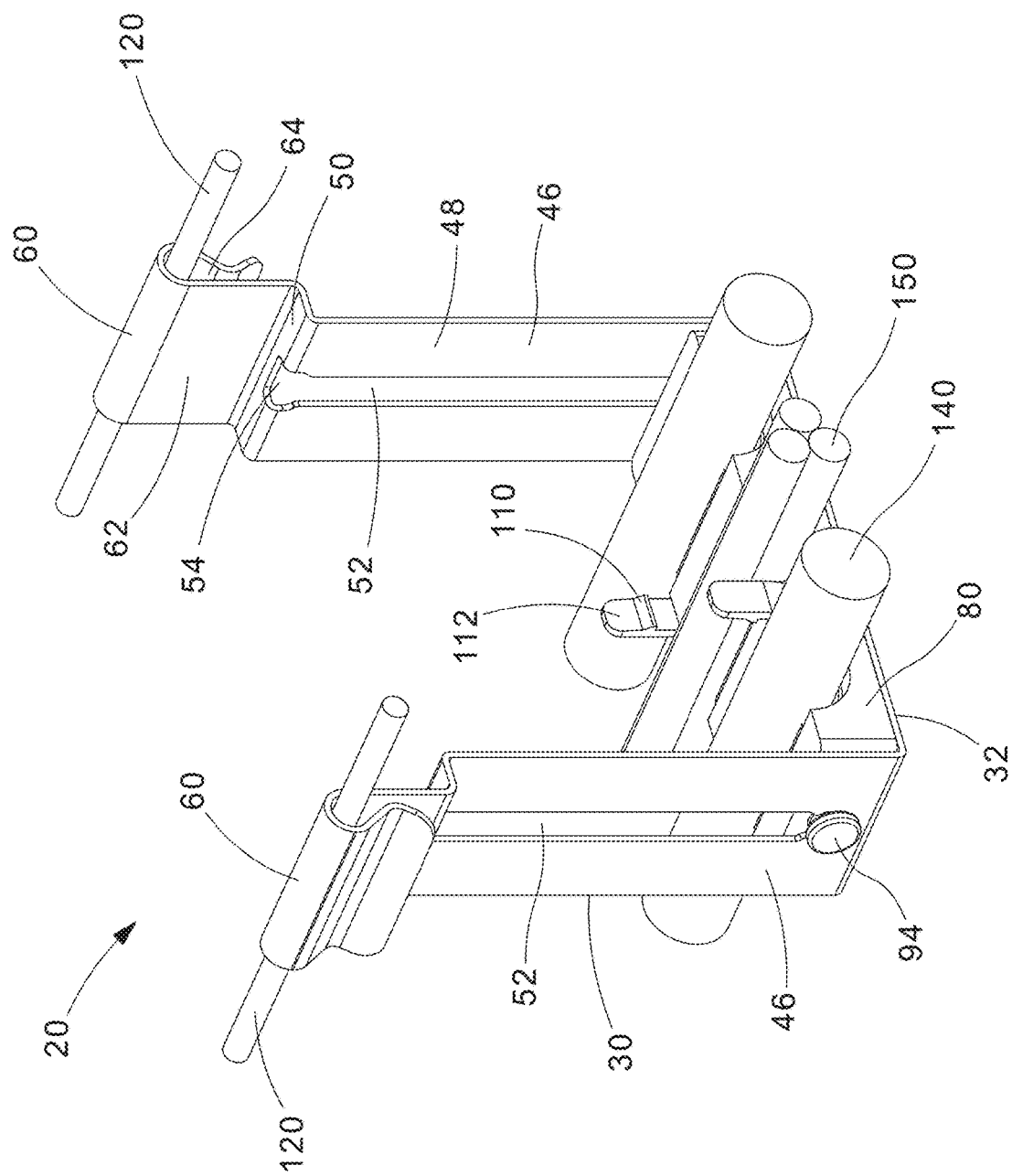
FIG. 4 is a perspective view of the partially assembled cable management system of FIG. 1 with a plurality of cables positioned on the clamp half.

As illustrated in FIG. 4, a first layer of cables 140, 150 is loaded onto the clamp half 80. Once the layer of cables 140, 150 has been loaded, a second clamp half 80 is installed in the U-shaped bracket 30. As illustrated in FIG. 5, the second or top clamp half 80 is installed with the saddles 100 facing downwards. The two clamp halves 80 are snapped together via the releasable latches 110 engaging the ledge 116 defined by notches 114 to create a cable clamp assembly. If cables need to be added or removed, the releasable latches 110 can be pulled open by using the thumb tab 112 for fast and easy removal. The installer can unlock the cable halves 80 by pushing the thumb tab 112 inward and pulling the cable clamp assembly apart.

Cable clamp assembly layers are added to the U-shaped bracket 30, as needed, using the same installation steps described above. For example, as illustrated in FIG. 6, a second cable clamp assembly with cables has been installed in the U-shaped bracket.

The cable management system of the present invention provides a bracket with securement slots that facilitate the ease of assembly and the loading of the clamp halves. The clamp halves of the present invention ensure cable separation that maintains cable free air space. The cable management system of the present invention provides an improved system with minimum components for supporting cables in solar applications.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A cable management system for supporting cables in solar applications, the cable management system comprising:
   a one piece U-shaped bracket having a base with two arms, wherein each arm includes a securement slot extending the length of the arm; and
   a cable clamp assembly positioned within the U-shaped bracket, wherein the cable clamp assembly includes a first clamp half having a top, a bottom, a front, a back, and sides, and a second clamp half having a top, a bottom, a front, a back, and sides; wherein button pads extend from each side of the first clamp half and each side of the second clamp half; the button pads slide in the securement slots to position the first clamp half and the second clamp half within the U-shaped bracket; wherein the first clamp half and the second clamp half are snapped together to form the cable clamp assembly.

2. The cable management system of claim 1, wherein the first clamp half and the second clamp half separate the cables installed in the U-shaped bracket.

3. The cable management system of claim 1, wherein the front and the back of the first clamp half have a releasable latch with a thumb tab and a notch with a ledge; and the front and the back of the second clamp half have a releasable latch with a thumb tab and a notch with a ledge.

4. The cable management system of claim 1, wherein the first clamp half and the second clamp half have a plurality of saddles for holding cables.

5. The cable management system of claim 4, wherein the saddles have compression inserts with ribs for receiving cables having different diameters.

6. The cable management system of claim 1, wherein each button pad extends through the securement slot in one of the arms and remains positioned adjacent an outer surface of the arm.

7. The cable management system of claim 1, wherein the U-shaped bracket further comprising messenger wires latches for securing messenger wires in solar applications, the messenger wire latches having a vertical member and a spring hook.

8. The cable management system of claim 7, wherein the messenger wire latches provide range taking capabilities for receiving various diameter messenger wires.

9. The cable management system of claim 1, wherein each securement slot has an entrance end and a circular bottom with locking tabs.

10. The cable management system of claim 1, wherein each arm of the U-shaped bracket has a vertical member and a horizontal member.

11. The cable management system of claim 10, wherein each securement slot has an entrance end in the horizontal member of each arm, the entrance end allows for loading of the first clamp half and the second clamp half without manipulating the U-shaped bracket.

12. The cable management system of claim 10, wherein each securement slot extends down a center of the vertical member of each arm of the U-shaped bracket.

13. The cable management system of claim 10, wherein each securement slot extends from an entrance end in the horizontal member of the arm to a circular bottom with locking tabs in the vertical member of the arm.

* * * * *